United States Patent [19]
Unternahrer

[11] Patent Number: 6,108,357
[45] Date of Patent: Aug. 22, 2000

[54] SINGLE HEAD LASER OSCILLATOR-AMPLIFIER

[75] Inventor: Josef Robert Unternahrer, Niskayuna, N.Y.

[73] Assignee: General Electric Company, Scheenctady, N.Y.

[21] Appl. No.: 09/184,346

[22] Filed: Nov. 2, 1998

[51] Int. Cl.[7] .............................. H01S 3/10; H01S 3/081; H01S 3/083
[52] U.S. Cl. .................................. 372/25; 372/93; 372/94
[58] Field of Search .............................. 372/25, 108, 106, 372/109, 93, 94, 9

[56] References Cited

U.S. PATENT DOCUMENTS

| | | |
|---|---|---|
| 5,127,019 | 6/1992 | Epstein et al. . |
| 5,131,957 | 7/1992 | Epstein et al. . |
| 5,730,811 | 3/1998 | Azad et al. .............................. 148/565 |

OTHER PUBLICATIONS

Koechner, "Solid–State Laser Engineering," 1992, pp: cover, 435–444, 476–481.

US Patent Appln. Serial No. 08/976,270; filed Nov. 21, 1997 (RD–25241).

*Primary Examiner*—Frank G. Font
*Assistant Examiner*—Armando Rodriguez
*Attorney, Agent, or Firm*—Patrick K. Patnode; Marvin Synder

[57] ABSTRACT

A circulating laser beam is generated in an oscillator having a gain medium. The laser beam is dumped from the oscillator to produce a laser beam pulse. The laser beam pulse is expanded and returned through the same gain medium for amplification thereof. The circulating laser beam and returning laser beam pulse travel in different paths through gain medium allowing the use of a small Pockels cell in the oscillator.

20 Claims, 2 Drawing Sheets

SINGLE HEAD LASER OSCILLATOR-AMPLIFIER

BACKGROUND OF THE INVENTION

The present invention relates generally to shot peening, and, more specifically, to laser shock peening.

In conventional shot peening, small balls are fired against the surface of a metallic workpiece or target to create plastic deformation thereat and a corresponding residual compressive stress. The residual stress improves the useful fatigue life of the workpiece when it is used in a high stress application.

Laser shock peening is being developed to provide improvements in forming the residual compressive stress in the workpiece surface. A laser is operated, typically, in a pulse mode for directing laser pulses against the workpiece surface, which workpiece surface typically has a light absorbing ablative coating confined by a thin layer of water for example. The laser pulse vaporizes the coating in a small explosion that is confined by the water developing an instantaneous pressure pulse. The resulting pressure pulse plastically deforms the workpiece surface to generate residual compressive stress therein.

A major control parameter in this process is the fluence of the laser beam that is defined as the energy per unit area of the beam. Fluence at the workpiece must be high for effecting laser shock peening, but fluence in the resonator or oscillator producing the laser beam must be low to prevent optical damage.

This control may be accomplished by using a low energy oscillator followed in turn by several rod amplifiers in which the fluence is increased in turn and protects the laser equipment from thermal damage. This configuration, however, requires many laser heads or lasing gain media, optical pumping flash lamps, power supplies, and related equipment that increases the complexity of the system and susceptibility to failure during operation.

Another useful laser system having few components is disclosed in U.S. Pat. No. 5,730,811-Azad et al. In this configuration, a large Q-switched, cavity-dumped, laser oscillator produces a significant fraction of the required energy for laser shock peening in a single-head resonator, either with or without an additional amplifier cooperating therewith. This high energy laser requires a suitably large oscillator and cooperating optical elements and Pockels cell for effecting the Q-switching and cavity-dumping. The large elements reduce the fluence in the oscillator for preventing thermal damage thereto from the high energy laser beam created therein.

The major component of the Pockels cell is a crystal of potassium dideuterium phosphate, also referred to as KD*P. For the energy levels required for laser shock peening, a crystal of about 5 cm in diameter is required. Homogeneity of the electric field in such a large diameter crystal requires a relatively long length thereof of about 6 cm. Accordingly, even the slightest absorption in the crystalline bulk constitutes a significant loss in the laser oscillator.

Furthermore, such absorption in the crystal creates optical distortion that causes the oscillator to produce a highly distorted output beam. This distortion problem may be mitigated by using a highly deuterated KD*P crystal greater than about 99%. Such a large Pockels cell crystal, however, is quite expensive, and therefore impractical to use in a commercial laser shock peening system.

Accordingly, it is desired to provide a laser shock peening apparatus with few components that does not require a large Pockels cell for producing a high fluence laser beam at the workpiece.

BRIEF SUMMARY OF THE INVENTION

A circulating laser beam is generated in an oscillator having a gain medium. The laser beam is dumped from the oscillator to produce a laser beam pulse. The pulse is returned through the same medium for amplification thereof. The circulating laser beam and returning pulse travel in different paths through the medium, allowing the use of a small Pockels cell in the oscillator.

DETAILED DESCRIPTION OF THE INVENTION

Figure 1:
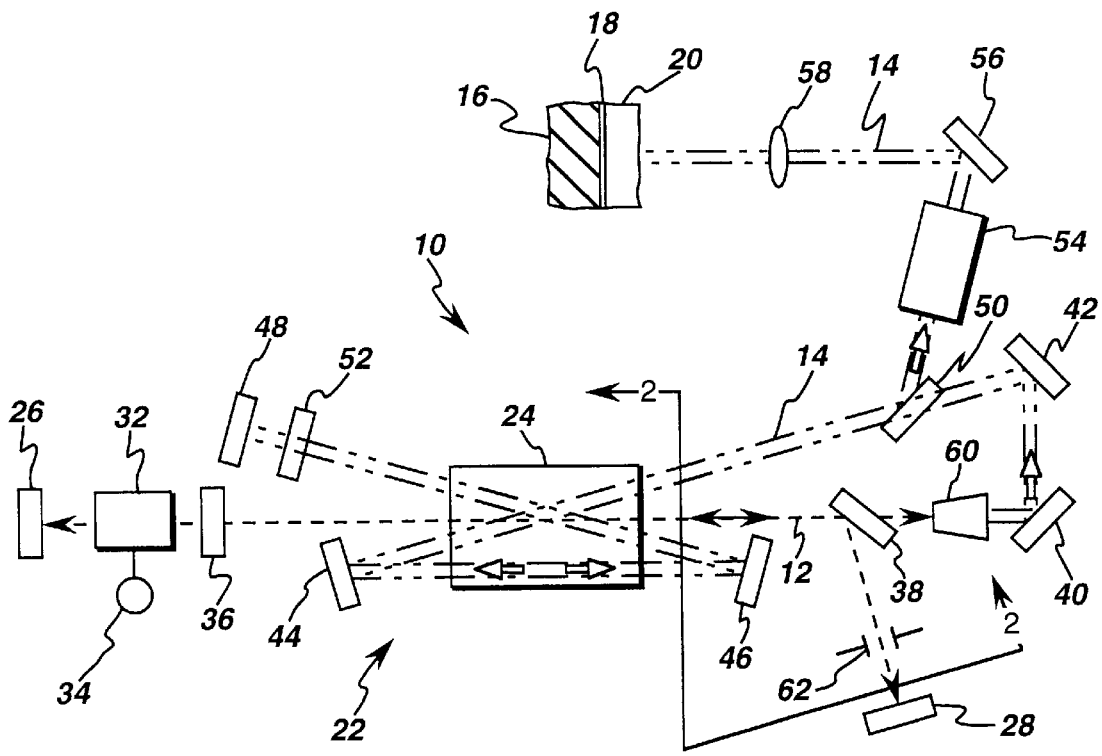
FIG. 1 is a schematic representation of a cavity-dumped laser shock peening apparatus in accordance with one embodiment of the present invention.

Illustrated schematically in FIG. 1 is a laser shock peening apparatus 10 in accordance with an exemplary embodiment of the present invention. The apparatus is effective for generating a circulating laser beam 12 that is dumped to produce a laser beam pulse 14, which pulse 14 is directed at a workpiece or target 16, typically a metalic workpiece for developing residual compressive stress at and below the surface thereof.

Target 16 may take any suitable form and may include a conventional ablative coating 18 in the form of black paint for example. A thin film of water 20 is typically provided over the coating for confining the exploding vapor resulting from impingement of laser beam pulse 14 against the coating.

Accordingly, a pressure pulse develops against the surface of target 16 causing the propagation of shock or stress waves into the target material which plastically deform the regions at and near the surface to retain a residual compressive stress thereat. A series of laser pulses 14 are suitably scanned across the surface of target 16 for obtaining substantially uniform laser shock peening thereof.

Apparatus 10 is an assembly of optical components including means for generating circulating laser beam 12 in a cooperating oscillator or resonator 22 having a lasing or gain medium 24. Means for dumping laser beam 12 from oscillator 22 produce laser beam pulse 14. And, means for returning laser beam 14, redirect laser beam pulse 14 through gain medium 24 for amplification thereof.

In order to obtain laser pulses 14 with suitable energy and temporal shape, oscillator 22 is preferably a Q-switched, cavity-dumping oscillator and may take various conventional configurations. For example, oscillator 22 includes first and second end mirrors 26, 28 having 100% reflectivity for circulating laser beam 12 therebetween as laser beam 12 is formed. End mirrors 26, 28 are optically aligned on opposite sides of gain medium 24, which gain medium 24 cooperates with flash lamps 30, shown in FIG. 2, for optically pumping gain medium 24 to develop laser beam 12 as laser beam 12 circulates between end mirrors 26, 28. Gain medium 24 and flash lamps 30 define a laser head that may take any conventional form, with suitable cooling thereof.

In order to dump laser beam 12 from oscillator 22 upon achieving a suitable energy level, means in the form of a Pockels cell 32 are disposed in optical alignment with gain medium 24 and end mirrors 26, 28. Pockels cell 32 is controlled by a driver 34 for effecting switching thereof to dump the circulating laser beam 12 and periodically emit laser beam pulses 14 in a train. Pockels cell 32 preferably cooperates with a quarter-wave plate 36 and a first polarizer 38 optically aligned between end mirrors 26, 28 in any suitable manner, such as on opposite sides of gain medium 24.

The components of oscillator 22 are preferably linearly aligned with each other along a longitudinal axis of gain medium 24, with second end mirror 28 being disposed obliquely thereto.

Pockels cell 32 is operable in a regeneration mode for circulating nascent laser beam 12 in oscillator 22 as energy is pumped therein from flash lamps 30. In the regeneration mode, first polarizer 38 acts as a mirror to reflect laser beam 12 obliquely to second end mirror 28, and in this way, laser beam 12 circulates back and forth between end mirrors 26, 28 as energy builds in gain medium 24.

Pockels cell 32 is also operable in a dumping mode for dumping laser beam 12 at or through polarizer 38 when sufficient energy is reached in oscillator 22 for laser pulse 14 being emitted therefrom.

Pockels driver 34 operates by providing a bias voltage across Pockels cell 32 for selectively controlling the wave retardation thereof. After gain medium 24 is initially pumped, driver 34 provides a bias voltage on Pockels cell 32 in the regeneration or high-Q mode to effect a suitable wave retardation so that developing laser beam 12 oscillates off polarizer 38 and between end mirrors 26, 28 for increasing energy in laser beam 12 by regeneration. When the oscillator beam reaches peak power, driver 34 suitably reduces the bias on Pockels cell 32 to change the retardation for diverting laser beam 12 through polarizer 38, bypassing second end mirror 28 for dumping laser beam pulse 14.

Oscillator 22, between end reflecting mirrors 26, 28, defines a cavity therebetween having an optical length that controls the round trip transit time of oscillating laser beam 12 that determines the pulse width of laser beam 12. The rise time of laser beam pulse 14 produced by oscillator 22 is controlled by the switching time of Pockels cell 32. In a preferred embodiment, oscillator 22 is effective for generating a series of laser beam pulses 14 each having an inherently sharp leading edge and a preferably square-wave for temporally shaping the pressure pulse developed at target 16 for improving the laser shock peening process.

During operation of the cavity when the gain therein is highest, the voltage on Pockels cell 32 is switched to the quarter-wave value so that circulating power in oscillator 22 starts to build up. In this regeneration mode, driver 34 is therefore on for effecting quarter-wave retardation in Pockels cell 32, which retardation is additive with the quarter-wave retardation in plate 36. As laser beam 12 travels through Pockels cell 32 and, quarter-wave plate 36 and is reflected and returned by first end mirror 26, laser beam 12 undergoes full wave retardation (360°) so that laser beam 12 reflects off polarizer 38 to second end mirror 28 and returns therefrom for repeating the circulating path for building energy. When the energy reaches a peak value, Pockels cell 32 is switched to a suitable off position for placing oscillator 22 in the dumping mode for extracting energy therefrom which energy is directed through polarizer 38 for subsequent use.

In one embodiment, driver 34 is configured to bias Pockels cell 32 to a zero voltage in the dumping mode that effects zero wave retardation in Pockels cell 32 to dump substantially all the energy stored in the cavity. With Pockels cell 32 being off, zero wave retardation is effected thereby and the only retardation is effected by quarter-wave plate 36, which in the reflected trip therethrough effects only half-wave retardation (180°) causing the polarized beam to pass through the oppositely polarized polarizer 38. In this way, maximum power may be developed in each individual laser pulse per cycle and dumped for subsequent use.

As discussed above, in order to increase laser beam energy, a laser oscillator may be increased in size and used in conjunction with one or more additional amplifiers for increasing energy in turn. Increased energy demand in the oscillator, however, requires an increase in size of the oscillator including the size of the Pockels cell and its crystal. Large Pockels cell crystals are prohibitively expensive in order to reduce oscillator losses and output beam distortion.

In accordance with one embodiment of the instant invention, gain medium 24 may be suitably large in size but cooperates with a relatively small Pockels cell 32 for defining the basic laser oscillator having limited energy capability in the circulating beam. In this way, the Pockels cell crystal may remain small and within reasonable cost, and, losses in oscillator 22 and distortion in the output beam are also reduced.

The use of a small Pockels cell, however, limits the energy capability of oscillator 22, with the output beam therefrom having too little fluence for laser shock peening use.

An additional feature of the present invention, therefore, is introducing means for returning or redirecting output laser beam pulse 14 from oscillator 22 back through gain medium 24 for amplification thereof in a single-head combined laser oscillator and amplifier.

By using a gain medium 24 sufficiently large for channeling therethrough both circulating laser beam 12 and returning laser pulse 14, both beam 12 and pulse 14 may be directed in different paths through the same medium 24 to prevent damage to the small Pockels cell 32.

More specifically, exemplary means for returning laser pulse 14 to gain medium 24 include third and fourth mirrors 40, 42 optically aligned with first polarizer 38 for reflecting back to gain medium 24 laser pulse 14 emitted therefrom. Third mirror 40 is preferably colinearly aligned with oscillator 22 along the circulating path defined between first mirror 26 and first polarizer 38. Third mirror 40 is oriented to reflect laser pulse 14 obliquely from the discharge path of laser pulse 14 to fourth mirror 42 disposed in optical alignment with third mirror 40. Fourth mirror 42 is oriented to reflect laser pulse 14 back through gain medium 24 from which it last came.

In this way, laser pulse 14 emitted from the oscillator 22 is immediately returned to the same gain medium 24 for being amplified thereby. The returned pulse may be amplified at least once in a single pass through gain medium 24, or in the preferred embodiment, laser pulse 14 is amplified in gain medium 24 in multiple passes therethrough.

Multi-pass amplification in gain medium 24 may be effected in various manners. For example, suitable means may be provided for geometrically separating the multiple passes through gain medium 24. In the embodiment illustrated in FIG. 1, another, or fifth mirror 44 is optically aligned with fourth mirror 42 and disposed on an opposite side of gain medium 24 for reflecting back laser pulse 14 a second time through gain medium 24 for additional amplification thereof.

Yet another, sixth, mirror 46 may be optically aligned with fifth mirror 44 on the opposite side of gain medium 24, or the same side as fourth mirror 42, to yet again reflect laser pulse 14 for a third time through gain medium 24.

Multi-pass amplification in gain medium 24 may also be effected by polarizing laser pulse 14 for separating multiple passes through gain medium 24 that share the same inbound and outbound path therethrough.

More specifically, after a linearly polarized beam passes through gain medium 24, the polarization of the beam is flipped, and the beam is reflected back along the same, but opposite, path through gain medium 24. After this second or return pass, the returning beam is separated from the outbound beam by using a suitable polarizer. Such polarization-separation is effective where the outbound and inbound beams completely share the same extracted volume in gain medium 24. Accordingly, the polarization-separation multi-pass amplification may be used in addition to geometrical separation to double the number of passes through the same gain medium 24.

Such a multi-pass doubling configuration is limited, however, to amplifiers that preserve polarization of laser beam 12, and are not sensitive to the state of polarization. Accordingly, gain medium 24 in the exemplary embodiment illustrated in FIG. 1 preferably is configured without polarizing elements such as conventional Brewsters' angle faces for preserving polarization of laser pulse 14 in gain medium 24.

In this way, the embodiment illustrated in FIG. 1 uses both geometric multi-pass separation and polarization-separation for doubling the multiple passes achievable in gain medium 24.

The polarization-separation of the multi-passes may be effected in the exemplary embodiment illustrated in FIG. 1 by introducing yet another, or seventh mirror 48 optically aligned with sixth mirror 46 on opposite sides of gain medium 24, with seventh mirror 48 being oriented to return laser pulse 14 along the same outbound path from sixth mirror 46. In this way, laser pulse 14 is returned by seventh mirror 48 to sixth mirror 46 in the same volume of gain medium 24, and from sixth mirror 46 laser pulse 14 is returned to fifth mirror 44 again in the same volume as the outbound path therebetween.

Laser pulse 14 is yet again directed from fifth mirror 44 toward fourth mirror 42 again in the same volume in gain medium 24 along which it first arrived. In this way, laser pulse 14 emitted from original oscillator 22 travels in three sequential and different outbound paths through gain medium 24 and is reflected back by seventh mirror 48 for retracing the same three paths in the inbound direction for a total of six multiple passes through same gain medium 24, with each pass increasing the energy of laser pulse 14.

Accordingly, the initially emitted laser pulse 14 may be returned to gain medium 24 using a plurality of relatively simple and inexpensive optical elements such as mirrors 40–48 optically aligned with gain medium 24 for effecting different multiple paths in the outbound direction, with the same multiple paths in the inbound direction, all of which paths are different than the original circulating path of oscillator 22 including Pockels cell 32. Accordingly, Pockels cell 32 is used solely in original oscillator 22 for first producing laser pulse 14 that is then further amplified in the same gain medium 24 independently of oscillator 22 and Pockels cell 32.

With geometrical multi-pass separation, the amplified laser pulse 14 may be extracted at any convenient location and directed toward target 16 for laser shock peening thereof. By also introducing polarization-separation of multi-passes, however, the inbound pulse must be separated from the outbound pulse for redirection to target 16 without return travel to original oscillator 22 and Pockels cell 32.

This is effected in accordance with an exemplary embodiment illustrated in FIG. 1 by introducing a second polarizer 50 on one side of gain medium 24 preferably downbeam from fourth mirror 42, and a second quarter-wave plate 52 anywhere after second polarizer 50, and preferably on an opposite side of gain medium 24 just before seventh mirror 48. In this way, laser pulse 14 emitted from oscillator 22 initially passes through second polarizer 50, undergoes three outbound multiple passes through gain medium 24, and has the polarization of laser pulse 14 rotated 900 by double passing through second quarter-wave plate 52 for the return three multiple passes inbound through gain medium 24.

The oppositely polarized laser pulse 14 then reaches second polarizer 50, which second polarizer 50 reflects laser pulse 14 obliquely therefrom. During the six passes through gain medium 24, the energy of laser pulse 14 is significantly increased. After laser pulse 14 is extracted from oscillator-amplifier 22 at second polarizer 50, laser pulse 14 may either be used directly for laser shock peening of target 16, or laser pulse 14 may be directed through an auxiliary amplifier 54, which auxiliary amplifier 54 may take any conventional configuration. From auxiliary amplifier 54, amplified pulse 14 may be suitably redirected using another, or eighth, mirror 56 through a suitable focusing lens 58 for then laser shock peening target 16.

Since oscillation and amplification are effectively decoupled in the same gain medium 24, the configuration of gain medium 24 may be optimized for maximizing the amplification of laser pulse 14 therein. For example, suitable means may be provided for upcollimating laser pulse 14 from oscillator 22 prior to return to gain medium 24. Upcollimating enlarges the area of laser pulse 14 and recollimates laser pulse 14 for amplification in the multiple passes through gain medium 24.

In a preferred embodiment, the upcollimating means include a telescope 60, which telescope 60 may comprise any conventional form including a plurality of lenses for enlarging the cross sectional area of laser pulse 14 and recollimating laser pulse 14 between first polarizer 38 and third mirror 40. Since telescope 60 enlarges the effective area of laser pulse 14 emitted from oscillator 22, the enlargement allows for a significant reduction in size of Pockels cell 32 and accompanying crystal, and also allows enhanced amplification of laser pulse 14 in gain medium 24 over a larger fraction of gain medium 24.

In this way, Pockels cell 32 may be sized relatively small to channel therethrough circulating laser beam 12 in a size smaller than upcollimated laser pulse 14. Pockels cell 32 preferably cooperates with an aperture 62 for confining circulating laser beam 12 in size substantially smaller than upcollimated pulse 14. Aperture 62 is preferably disposed in optical alignment with second mirror 28 and is configured and sized for maintaining the size of circulating laser beam 12 relatively small, yet allows magnification of laser pulse 14 in telescope 60 to maximize the size thereof as laser pulse 14 is amplified in gain medium 24.

Figure 2:
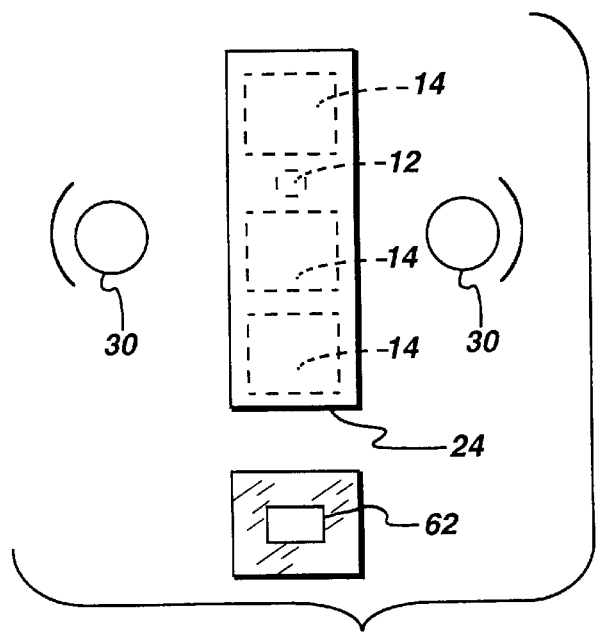
FIG. 2 is a elevational view through a section of the apparatus illustrate in FIG. 1 and taken along line 2—2.

As shown in FIG. 2, gain medium 24 is preferably in the form of a rectangular slab as opposed to a cylindrical rod. Gain medium 24 may be formed of a suitable material such as Neodymium (Nd) doped glass or the like. The rectangular cross section of gain medium 24 is especially suitable for the combined oscillator-amplifier because under significant thermal load the rectangular cross section preserves the polarization in a large central fraction of the whole cross section of gain medium 24. In this way, most of the volume of gain medium 24 may be completely swept by laser pulse 14, also having a rectangular intensity profile. The preferred rectangular profile of aperture 62 is illustrated in FIG. 2 and is configured and sized to complement the rectangular profile of gain medium 24 due to the magnification of telescope 60.

The resulting single head oscillator-amplifier apparatus 10 illustrated in FIG. 1 reduces or eliminates the need for independent and sequential amplifiers for use in laser shock peening. Circulating laser beam 12 is dumped from oscillator 22 and then redirected therethrough in one or more multiple paths for amplification of laser pulse 14, which laser pulse 14 is then redirected from gain medium 24 toward target 16 for peening thereof.

A relatively small Pockels cell 32 may therefore be used with a relatively large gain medium 24 for maintaining low fluence therethrough, while achieving high fluence of laser pulse 14 upon reaching target 16. Pockels cell 32 may therefore be relatively inexpensive, and oscillator 22 losses therefrom may be minimized. Furthermore, small circulating laser beam 12 has minimal distortion in development resulting in a high energy amplified laser pulse 14 effective for laser shock peening.

Figure 3:
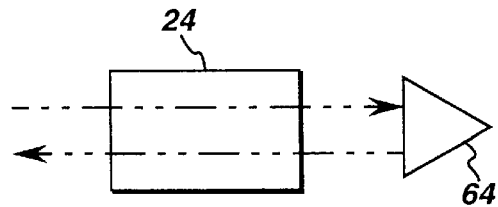
FIGS. 3–6 are schematic views of various optical elements cooperating with the gain medium of the apparatus illustrated in FIG. 1 for effecting multiple amplification passes therethrough in accordance with additional embodiments of the present invention.

The various components of single head oscillator-amplifier 10 illustrated in FIG. 1 may be rearranged as desired for obtaining functionally equivalent operation. FIG. 1 illustrates an embodiment including both triple pass amplification doubled to six pass using polarization-separation. FIG. 3 illustrates schematically another embodiment of the invention wherein a prism 64 may be optically aligned with gain medium 24 for effecting double pass amplification, which amplification may be doubled using polarization-separation in a corresponding variation of the FIG. 1 embodiment.

Figure 4:
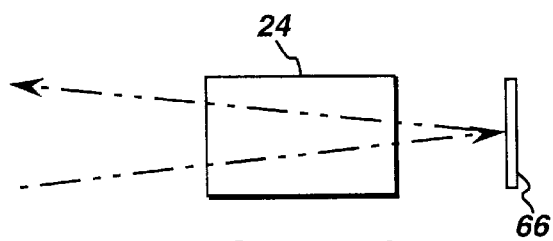

FIG. 4 illustrates the use of an additional mirror 66 cooperating with gain medium 24 for effecting another variation of double pass therethrough, which double pass may also be doubled using polarization-separation in yet another variation of the FIG. 1 embodiment.

Figure 5:
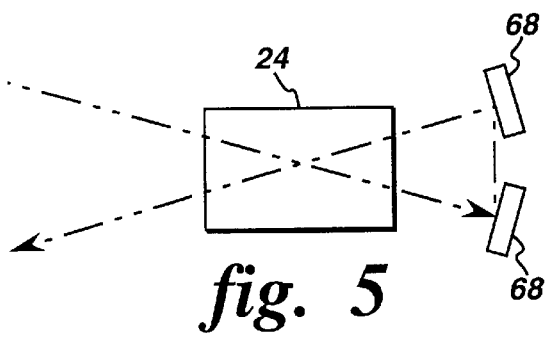

FIG. 5 illustrates yet another double pass embodiment using a pair of crossing mirrors 68 suitably aligned for effecting crossing passes through gain medium 24, which again may be doubled using polarization-separation in yet another variation of the FIG. 1 embodiment.

Figure 6:
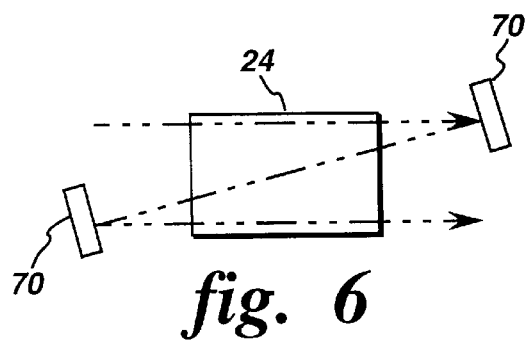

FIG. 6 illustrates a pair of oblique mirrors 70 disposed on opposite sides of gain medium 24 for effecting triple pass therethrough, which again may be doubled using polarization-separation in yet another variation of the FIG. 1 embodiment.

In all of the various embodiments disclosed above, multiple amplification passes of laser beam pulse 14 may be obtained using the same gain medium 24 initially used for forming laser pulse 14 in different paths therethrough. A relatively small Pockels cell 32 may therefore be used for Q-switch dumping circulating laser beam 12 upon achieving initial energy build up, with further energy build up being achieved in the subsequent multiple passes through the same gain medium 24.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A method of producing a laser beam pulse comprising:
    generating a circulating laser beam in an oscillator having a gain medium;
    dumping said laser beam from said oscillator to produce said laser beam pulse; and
    returning said laser beam pulse through said gain medium for amplification thereof.

2. A method according to claim 1 further comprising returning said laser beam pulse in a different path through said gain medium than said circulating beam.

3. A method according to claim 2 further comprising amplifying said laser beam pulsein said gain medium in multiple passes therethrough.

4. A method according to claim 3 further comprising geometrically separating said multiple passes through said gain medium.

5. A method according to claim 3 further comprising polarizing said laser beam pulse for separating said multiple passes through said gain medium.

6. A method according to claim 3 further comprising preserving polarization of said laser beam pulsein said gain medium.

7. A method according to claim 3 further comprising:
    geometrically separating said multiple passes through said gain medium; and
    polarizing said laser beam pulse for doubling said multiple passes.

8. A method according to claim 3 further comprising upcollimating said laser beam pulse prior to return to said gain medium.

9. A method according to claim 8 further comprising confining said circulating laser beam in size smaller than said upcollimated laser beam pulse.

10. A method according to claim 9 further comprising redirecting said amplified laser beam pulse from said gain medium against a workpiece for laser shock peening thereof.

11. An apparatus for producing a laser beam pulse comprising:
    means including an oscillator having a gain medium for generating a circulating laser beam;
    means for dumping said laser beam from said oscillator to produce said laser beam pulse; and
    means for returning said laser beam pulse through said gain medium for amplification thereof.

12. An apparatus according to claim 11 wherein said returning means are effective for returning said laser beam pulse in a different path through said gain medium than said circulating laser beam.

13. An apparatus according to claim 12 wherein said returning means are effective for redirecting said laser beam pulse in multiple passes through said gain medium for amplification therein.

14. An apparatus according to claim 13 wherein said returning means are effective for geometrically separating said multiple passes through said gain medium.

15. An apparatus according to claim 14 further comprising means for upcollimating said laser beam pulse prior to return to said gain medium.

16. An apparatus according to claim 15 wherein said dumping means comprise a Pockels cell and a polarizer optically aligned in series with said gain medium, with said Pockels cell being operable in a regeneration mode for circulating said laser beam in said oscillator, and in a dumping mode for dumping said laser beam at said polarizer to said upcollimating means.

17. An apparatus according to claim 16 wherein said Pockels cell is sized to channel therethrough solely said circulating laser beam in a size smaller than said upcollimated laser beam pulse.

18. An apparatus according to claim 16 wherein said returning means comprise a plurality of optical elements optically aligned with said medium in a different path than said Pockels cell.

19. An apparatus according to claim 16 wherein said optical elements comprise mirrors.

20. An apparatus according to claim 16 wherein said upcollimating means comprise a telescope.

* * * * *